March 26, 1968 R. E. LUNDBERG ET AL 3,375,152
METHOD AND APPARATUS FOR APPLYING CONTINUOUS LENGTHS OF
POLYMERIC FILM TO THE SIDES OF A RIGID SUBSTRATE
Filed Nov. 4, 1963 5 Sheets-Sheet 2

FIG. 2

INVENTORS
RONALD E. LUNDBERG
FRANK J. WEGRZYN
BY Robert W Black
ATTORNEY

INVENTORS
RONALD E. LUNDBERG
FRANK J. WEGRZYN

BY *Robert W Black*

ATTORNEY

March 26, 1968  R. E. LUNDBERG ET AL  3,375,152
METHOD AND APPARATUS FOR APPLYING CONTINUOUS LENGTHS OF
POLYMERIC FILM TO THE SIDES OF A RIGID SUBSTRATE
Filed Nov. 4, 1963  5 Sheets-Sheet 4

INVENTORS
RONALD E. LUNDBERG
FRANK J. WEGRZYN

BY *Robert W Black*

ATTORNEY

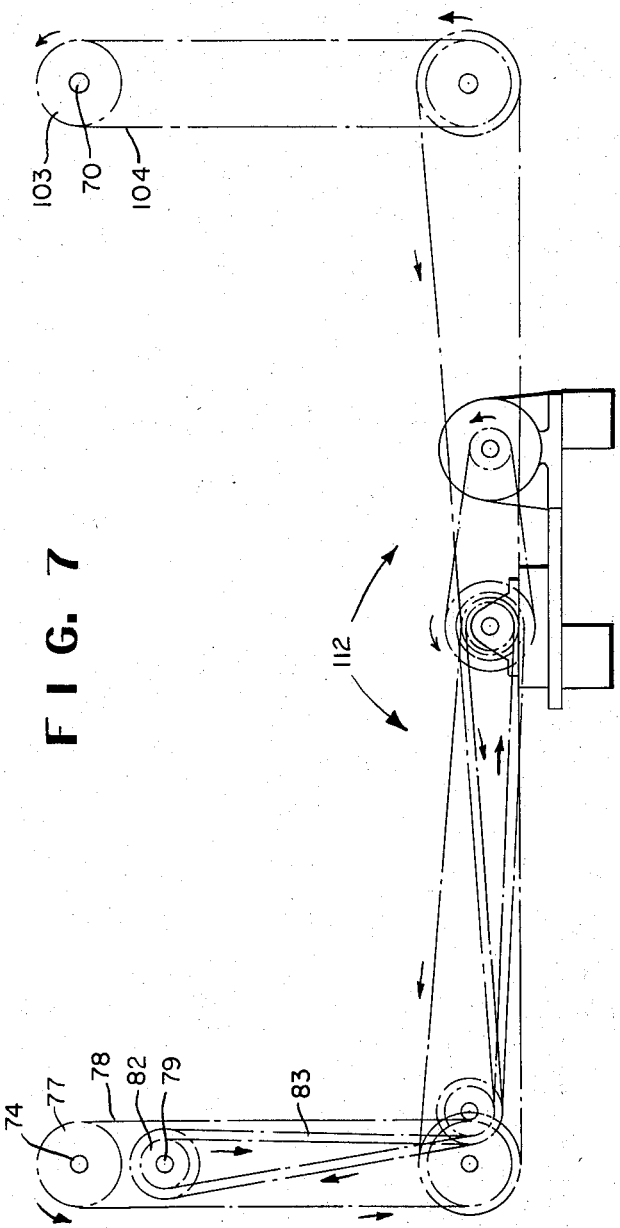

United States Patent Office 3,375,152
Patented Mar. 26, 1968

3,375,152
METHOD AND APPARATUS FOR APPLYING CONTINUOUS LENGTHS OF POLYMERIC FILM TO THE SIDES OF A RIGID SUBSTRATE
Ronald E. Lundberg, Grand Island, and Frank J. Wegrzyn, Williamsville, N.Y., assignors to E. I. du Pont de Nemours and Company, Wilmington, Del., a corporation of Delaware
Filed Nov. 4, 1963, Ser. No. 321,066
10 Claims. (Cl. 156—212)

This invention relates to processes and apparatus for applying continuous lengths of polymeric film to at least four sides of a substrate and more particularly processes and apparatus for adhesively wrapping a rigid cellulosic substrate with continuous lengths of polymeric film.

Certain films, such as polyvinyl fluoride, are noted for their attractive properties. Polyvinyl fluoride film possesses an unusual combination of excellent resistance to outdoor weathering exposures, a high degree of physical toughness, chemical inertness, abrasion resistance, resistance to soiling and the action of solvents as well as an amazing retention of these properties at both low and elevated temperatures. The above combination of properties not only strongly suggests many areas of use for polyvinyl fluoride in the form of self-supporting films, but also the use of such films as the outer layers of a wide variety of laminar structures destined chiefly for outdoor use. The polyvinyl fluoride films serve to upgrade less functional substrates, imparting to the final structure a degree of utility not to be found solely in either film or substrate.

The use of pigmented and unpigmented polyvinyl fluoride films (particularly the former) as components of laminar structures empolyed as prefinished building siding and roofing in domestic, commercial and industrial installations has increased greatly. While one skilled in the art will recognize the comparative ease with which a flat substrate of even relatively large surface area can be continuously combined with a polymeric film through a suitable adhesive inter-layer, in order that polyvinyl fluoride films shall offer to the supporting structure at least the degree of weather protection offered by commercially available paints, it is necessary that the film protect all edges of the lamination that are to be exposed to the weather in the final construction. For example, with so-called vertical siding exemplified by board and batten construction, large sheets of plywood are employed and it is necessary, for both functional and esthetic reasons, to conceal the vertical butt joints between adjacent pieces of siding. This is accomplished by the use of batten strips. Where pieces of siding covered with polyvinyl fluoride film are employed, the batten strips should also be covered with polyvinyl fluoride film. The batten strips must be covered with film completely on the three exposed faces and, to protect against edge leakage, the film must extend partly across the fourth face of the batten strip from both edges.

Where construction employs horizontal techniques exemplified by clapboard or beveled siding construction, each successive horizontally positioned board is partially shingled by the board immediately above. Consequently, to afford the proper protection to the board, the polyvinyl fluoride film must cover virtually all of the exposed vertical width of the board. Optionally, the film may also cover that portion protected by the board above. All of the lower edge of the board and, to protect against edge leakage, at least a portion of the film should be turned under against the reverse side of the board. Obviously, covering many surfaces of a board presents many problems if the manufacture of laminar structures is to be accomplished on a continuous basis and economically.

It is, therefore, an object of this invention to provide processes and apparatus for applying continuous lengths of polymeric film to at least four surfaces of a substrate.

It is a further object of this invention to provide processes and apparatus which will continuously and economically wrap at least four surfaces of rigid, cellulosic substrates with flexible polymeric film to provide weatherable laminar structures.

These and other important advantages of the invention will become apparent as the same is more fully understood from the following description, which, taken in connection with the accompanying drawings, discloses preferred embodiments of the invention wherein:

FIGURE 2 is a sectional view with parts removed taken along line 2—2 of FIGURE 1;

FIGURE 7 is a schematic side elevational view of the drive mechanism of the apparatus.

Figure 1:
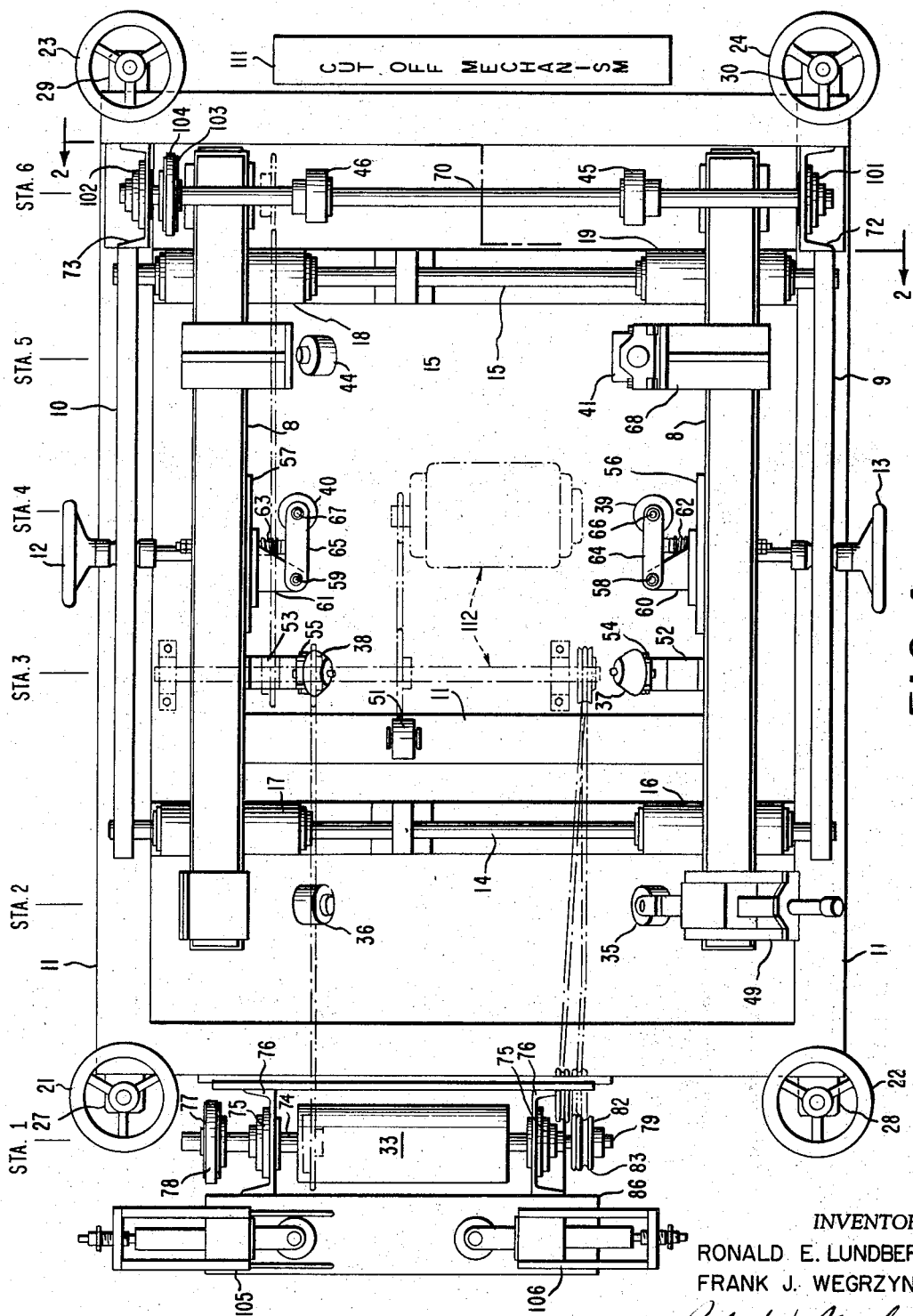
FIGURE 1 is a plan view of the apparatus with parts removed.

Because of the wide range of width, length and thickness of the substrates to be clad with films, flexibility of adjustment is a prime requisite. Once the adjustments are made to handle a substrate of given dimensions, it is also necessary that the apparatus be capable of self-accommodation to the continually changing pattern of dimensional irregularities commonly experienced with most substrates.

For simplicity of presentation, an apparatus suitable for cladding four-sided elongated substrates with flexible film will be described with reference to the above drawings. The process of the present invention will be described with regard to the cladding of batten strips and beveled siding in order to demonstrate the versatility of the apparatus and some of its self-adjustability.

In the drawings, a carriage 8 is mounted on bars 9 and 10 on frame 11 and is adapted to travel transversely to the length of the frame by hand-cranked feed screws 12 and 13. Screws 12 and 13 extend through the frame and are screwed into brackets (not shown) attached to the underside of the carriage. The transverse movement of the carriage is guided by rods 14 and 15 located at each end of the carriage, the rods are attached to each side of the frame and journaled in journal boxes 16, 17, 18 and 19.

For portability of the apparatus, each corner of the underside of the frame has rollers 20 attached. When the apparatus is in operation, hand-cranked screws 21, 22, 23 and 24 raise rollers 20 off of the floor and pads 25 and 26 (two pads not shown) are lowered and serve to stabilize the apparatus. Each of screws 21, 22, 23 and 24 extend through brackets 27, 28, 29 and 30 attached to the top ends of the frame and brackets 31 and 32 (two brackets not shown) attached to the bottom ends of the frame.

Mounted on the end of the frame closest to the exit of a conventional substrate alignment and advancing apparatus (not shown) and web alignment device (not shown) and extending above the frame on the same level with the carriage 8 are cylindrical rubber-covered nip rollers 33 and 34. Rollers 33 and 34, driven by a variable speed drive 112 shown schematically mounted on the lower portion of the frame, continuously advance the substrate within and out of the wrapping apparatus.

Roller 33, with a center shaft 74 extending through and rotatable in end bearing supports 75, mounted on brackets 76 attached to frame 11, has a V-belt drive pulley 77 secured at one end of the shaft and is driven by a V-belt drive 78 with the variable speed drive (not shown).

Figure 5:
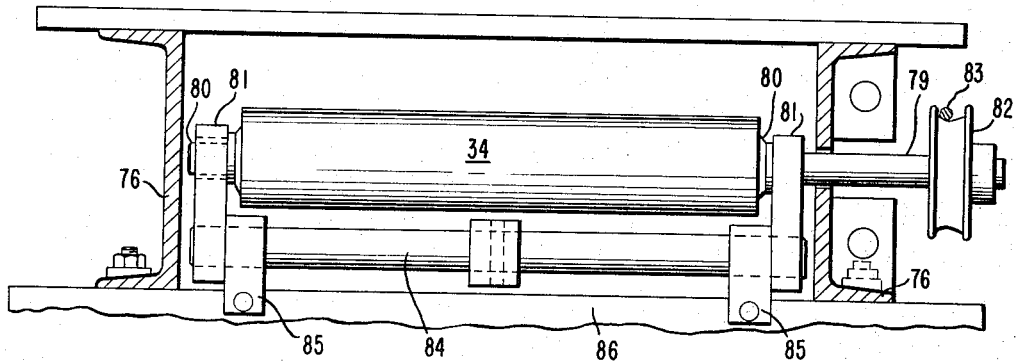
FIGURE 5 is a top view of the lower roller of the nip-rollers.

Rubber-covered roller 34, disposed under roller 33, with a center shaft 79 mounted through bearings 80 in movable arms 81 has a round belt drive pulley 82 secured at each end and is driven by a round belt drive 83 with a variable speed drive 112 shown schematically. As shown in FIGURE 5, movable arms 81 are mounted on a pivotable shaft 84 in brackets 85, which are bolted to an L-frame unit 86 which in turn is bolted to channel members 76. Pivotable shaft 84 is pressure loaded so that roller 34 is under constant upward pressure and is responsive to variations in substrate thicknesses. Roller 34 and its corresponding assembly can be tilted or canted as a unit from the horizontal to accommodate beveled siding. Either side of frame 86 can be raised or lowered (thus roller 34) by bolting frame member 86 to channel members 76 at various vertical locations. After adjusting frame 86 to the desired angle for roller 34, frame 86 is securely fastened to frame 11.

Figure 4:
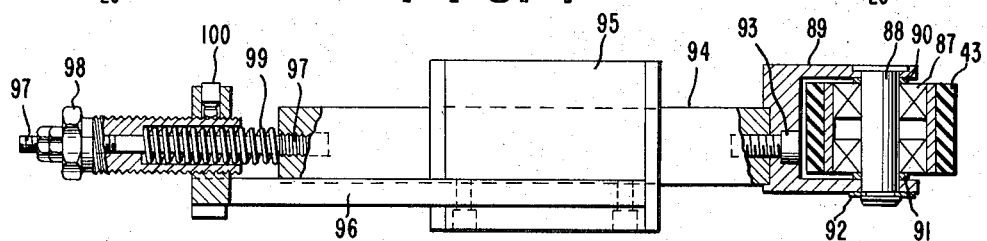
FIGURE 4 is a sectional view of a spring roller.

Roller assemblies 105 and 106 are similar in design to the roller shown in FIGURE 4 and serve as guide rollers for locating the advancing substrates with respect to nip-rollers 33 and 34. Roller assemblies 105 and 106 are mounted on frame 86 such that the roller surfaces are on the same plane as the nip formed between nip-rollers 33 and 34.

Mounted in sequence on carriage 8 in alignment with nip-rollers 33 and 34 are cylindrical, rubber-covered edge rollers 35 and 36, rubber-covered conical rollers 37 and 38, cylindrical, rubber-covered side rollers 39 and 40, four cylindrical, rubber-covered rollers 41, 42, 43 and 44 and cylindrical rubber-covered rollers 45, 46, 47 and 48. Rollers 35, 36, 41, 42, 43, 44, 47 and 48 are spring loaded adjustable rollers and roller 43 is shown in detail in FIGURE 4.

Rubber-covered roller 43, rotatable over bearings 87 on center shaft 88 is mounted in yoke 89 and spaced therefrom by spacers 90 and 91. The shaft 88 is held in the yoke 89 by its flange on one end and retaining ring 92 on the other. The base of the yoke has a bolt hole for tapped bolt 93 for locking the yoke at the desired angle to square rod 94. Square rod 94 has bearings 95 on each of the four sides which are secured to appropriate frame unit 96. The square rod on the opposite end has a tapped bolt hole and bolt 97 therein and prevents the entire assembly from falling out. Outer nut 98 in cooperation with spring 99 moves the roller 43 in or out and keeps a constant pressure thereon. Set screw 100 holds the assembly at the desired position.

Rollers 35 and 36 are mounted on supports 49 and 50 which project downward and toward each other at angles of about 45° to the vertical, each support in turn bolted directly opposite each other on carriage 8. An idler roller (not shown) centered directly under the gap between rollers 35 and 36 is bolted to frame 11 and upon which the substrate passes over. A second idler roller 51 located intermediate edge rollers 35 and 36 and conical rollers 37 and 38 is bolted to frame 11.

Conical rollers 37 and 38 are attached to each side of carriage 8 by brackets 52 and 53 and are pivotably attached to the brackets by pins 54 and 55. The next rollers in the sequence, side rollers 39 and 40, are attached to each side of carriage 8 by plates 56 and 57. Rollers 39 and 40 are pivotable on pins 58 and 59 inserted through brackets 60 and 61 which extend from plates 56 and 57. Tensioning springs 62 and 63 are attached between pivot arms 64 and 65, pivotable at one end upon pins 58 and 59; and, attached at the other end by pins 66 and 67 are rollers 39 and 40, and the base of brackets 60 and 61.

Figure 3:
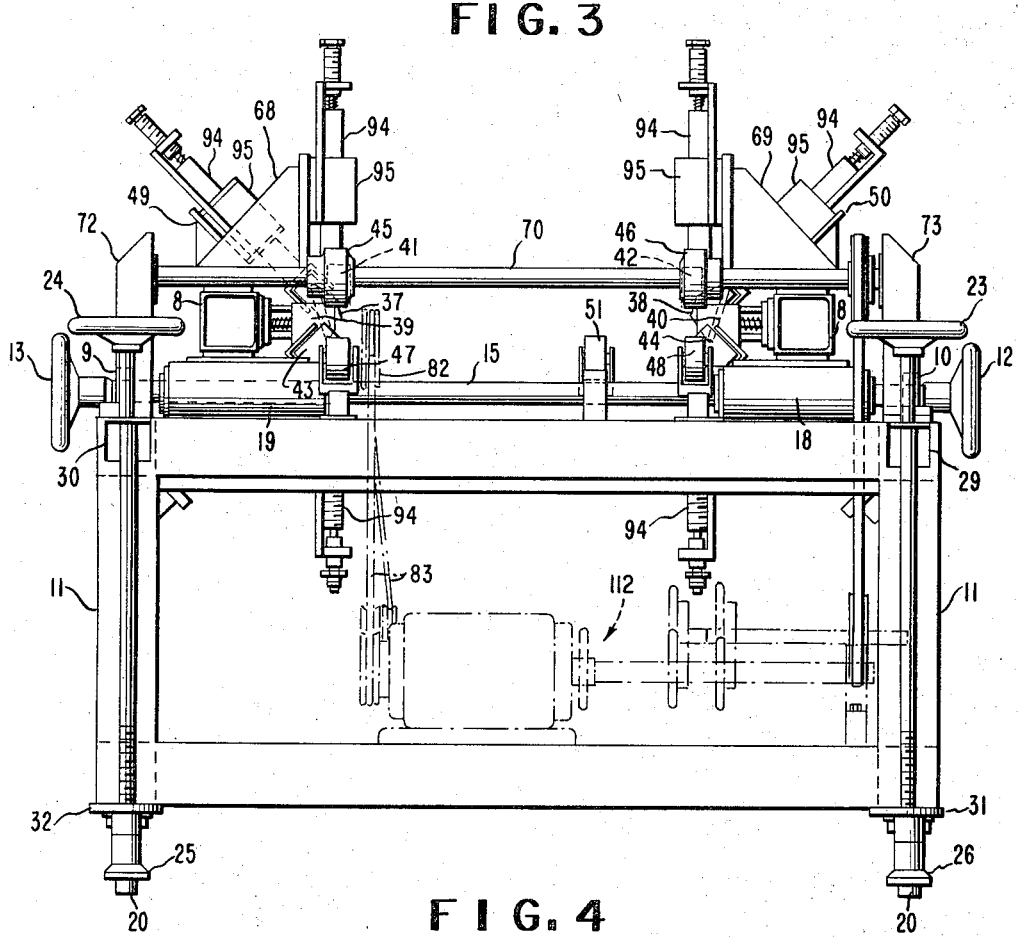
FIGURE 3 is an end view of the apparatus with the cut-off mechanism not shown.

Rollers 41 and 42 are vertically disposed rollers shown in FIGURE 3 which are mounted on brackets 68 and 69 which are bolted to each side of carriage 8. Rollers 43 and 44 are identical in design to rollers 41 and 42, are mounted on brackets (not shown) attached to carriage 8, are disposed directly under rollers 41 and 42 and project upward and toward each other at angles of about 45° to the vertical.

Rollers 45 and 46 are mounted on rod 70 in line and in the same plane as rollers 41 and 42 and set in place with set screw 71. Rod 70 extends across the width of the apparatus and is attached to frame 11 by channel brackets 72 and 73. Rod 70 is rotatable and supported in end mounted bearings 101 and 102 on channel brackets 72 and 73 respectively. V-belt drive pulley 103 mounted on rod 70 driven by V-belt drive 104 is driven by the same variable speed drive 112 as rollers 33 and 34.

In operation, successive lengths of substrate, commonly 6 to 16 feet long, are aligned and advanced in mutually end-abutting relationship into the nip between cylindrical rubber-covered combining rollers 33 and 34. Rollers 33 and 34, driven by a variable speed drive 112 shown schematically, continuously advance the substrate at a lineal speed just sufficiently faster than the lineal speed at which the lengths of substrate approach the nip to preferably provide for a small separation between successive lengths of substrate to permit an automatic end-sensing and cut-off device to operate at the end of the wrapping section of the apparatus. This separation is adjustable over the range of zero to three-eighths inch.

The polymeric film to be applied to the substrate exits from a conventional adhesive application and activation section and wraps a portion of the circumference of combining roller 33 before the substrate and film come into adhesive contact at the nip. A conventional web alignment device (not shown) near the exit end of the adhesive application and activation section centers the film in the combining nip and the substrate alignment and advancing apparatus determines that portion of the film width with which the top surface of the substrate will first be brought into adhesive contact. When wrapping batten strips, the substrate width is usually centered in the film width while with lengths of beveled siding, the thinner edge is registered with one edge of the film.

An adhesive is applied to the film prior to contacting the substrate and it will become apparent that this is a more convenient arrangement than to apply adhesive to the different surfaces of the substrate, although the latter alternative is entirely possible. The adhesive can be any which provides a satisfactory bond between the substrate and film. A typical adhesive is of the solvent-activatable type where the high level of tack necessary for successful combining of film and substrate is established either by lightly moistening with solvent the solvent-free adhesive layer or by controlling the volatilization of solvent from a solution-applied adhesive composition. Alternatively, the adhesive can be of the heat activatable type where the necessary combining tack is established by raising the temperature of at least the surface of a thermoplastic adhesive coating, for example, through the use of radiant heating means. Preferred adhesives are the aminoester modified vinyl polymers described in copending U.S. patent application Ser. No. 218,103, filed Aug. 20, 1962, in the name of Hugo Ralph Usala and the epoxy resin aminoester modified vinyl polymers described in copending U.S. patent application Ser. No. 218,102, filed Aug. 20, 1962 now Patent No. 3,228,823, in the names of Hugo Ralph Usala and Leon E. Wolinski, both applications assigned to the assignee of the present application. Initially the adhesive can be applied to the film by spray coating, roller coating or curtain coating techniques.

The use of a high tack adhesive is essential to prevent slip between the polymeric film and the substrate as they are advanced together through the various stations of the wrapping apparatus. To increase the range of utility of a variety of adhesive systems, combining roller 33 can be provided internally with passages for a heat transfer fluid.

Combining roller 34 is a "floating" roller adjustably spring loaded which permits it to tilt in conformance with the under surface of beveled siding.

Figure 6:
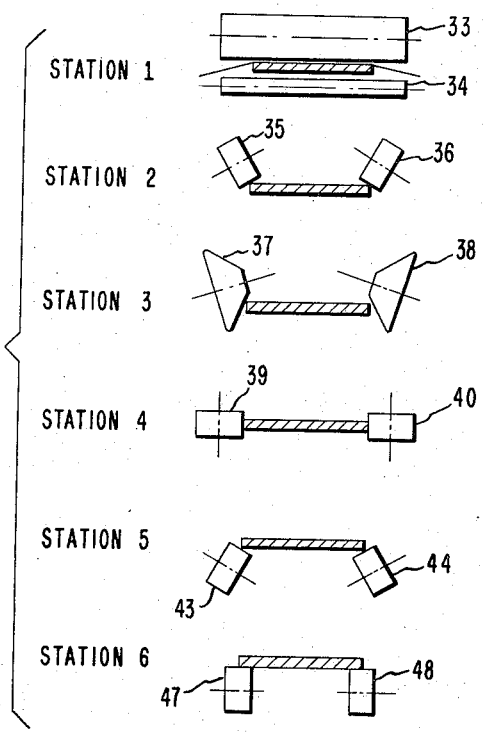
FIGURE 6 is a schematic view illustrating the wrapping sequence at stations 1 to 6 shown on FIGURE 1.

As the film-clad substrate continues to advance, the portions of the film not adhered to the upper surface thereof begin to bend in the direction in which they will eventually be applied to successive surfaces bounding the cross section of the substrate. This is caused in part by the natural drape of the film and in part by the squeegee action of the rubber covering of combining roller 33 over the top edges of the substrate. (Station 1 of FIGURE 6.)

The film-clad substrate next passes over a cylindrical, spring-loaded (adjustable tension) tiltable, rubber-covered idler roller (not shown) and under a pair of rubber-covered, constant pressure, adjustable edge rollers 35 and 36, the surface of each of which maintains continuous rolling contact simultaneously with the upper edges of the substrate and with one of the next contiguous, cross section-bounding surfaces thereof forming an edge therewith by virtue of the indenting of the rubber covering by said edge. These rolls are preferably cylindrical, as shown (although frusto-conical rolls tapering in a generally downward direction may be used) and each is pivotably supported not only about an axis perpendicular to the imaginary plane generated by its rolling surface but also about an axis parallel to the direction of travel of the length of substrate through the apparatus.

Pivotability about the first-mentioned axis permits each edge roller 35 and 36 to be skewed fore and aft to positions where its axis of rotation forms other than a right angle with the edge of the substrate with which it is in rolling contact. Pivotability about the second-mentioned axis permits each edge roller 35 and 36 to be tilted to vary and control the acute angles formed between its rolling surface and each of the contiguous, edge-forming, cross section-bounding substantially planar surfaces with which it makes simultaneous rolling contact. Edge rollers 35 and 36 can be skewed or tilted a few degrees either way to alter tension on the film and to increase or decrease the wiping action of their rolling surfaces on the film. While it is preferred to operate without skew (i.e., with the axis of rotation forming a right angle with the edge of the substrate) and without tilt (i.e., with the rolling surface forming equal acute angles with both contiguous, edge-forming substantially planar surfaces with which it makes simultaneous rolling contact), the degree of adjustability provided by skewing and tilting permits the avoidance of wrinkling and scalloping of the film which would otherwise occur in the less than ideal situations where films of imperfect gauge and sheet flatness must be employed or where there are substrate variations.

Mounting of edge rollers 35 and 36 as well as subsequent rollers on the carriage allows the spacing between each pair of rollers to be varied to accommodate substrates having different nominal widths ranging from as little as 2 inches to over 12 inches. The action of edge rollers 35 and 36 serves to bend the previously unadhered portions of the width of the polymeric film closer to the cross section-bounding surfaces of the substrate to which they are next to be adhered. (Station 2 of FIGURE 6.)

The film-clad substate continues to advance respectively over idler roller 51 and between a pair of rubber-covered, frusto-conical idling rollers 37 and 38, the surface of each of which maintains continuous rolling contact with a portion of the width of one of the substantially planar, cross section-bounding surfaces of the substrate contiguous to and forming an edge with the top surface thereof, i.e., in the case of beveled siding and batten strips, in rolling contact with a portion of their vertical sides, save for the interposition therebetween of the polymeric film. (Station 3 of FIGURE 6.)

The film-clad substrate advances between a pair of cylindrical, rubber-covered, constant pressure, adjustable idling side rollers 39 and 40 each of which maintains continuous rolling contact with the entire width of the surface contacted by the conical rollers and which serve to press previously unadhered portions of the polymeric film into adhesive contact with the substrate. Further, by virtue of the squeegee action of their rubber covering over the lower edges of the substrate, the remaining unadhered portions of the polymeric film are folded over these edges and are bent in a direction facilitating their subsequent application to the undersurface of the substrate. (Station 4 of FIGURE 6.)

As were edge rollers 35 and 36, side rollers 39 and 40 are also pivotably supported not only about an axis perpendicular to the imaginary plane generated by their rolling surface but also about an axis parallel to the direction of travel of the length of substrate through the apparatus. The side rollers can be skewed fore and aft a few degrees either way about the first-mentioned axis to alter tension and/or wiping action of their rolling surfaces on the film. They will be tilted in either direction about the second-mentioned axis if the substantially planar surfaces with which they must maintain rolling contact are other than absolutely vertical surfaces.

The advancing film-clad substrate next comes into contact with a pair of preferably cylindrical, rubber-covered, constant pressure, adjustable idling edge rollers 43 and 44, the surface of each of which maintains continuous rolling contact simultaneously with one of the "sides" of the substrate and with the undersurface thereof (save for the interposition therebetween of the polymeric film) by virtue of the indenting of the rubber covering by each edge formed by a side and the undersurface of the substrate. These rolls are identical in design and function to edge rollers 35 and 36 and are similarly mounted for traveling toward and away from the substrate, except that their immediate supports project upward and generally toward each other at angles of about 45° to the vertical. Edge rollers 43 and 44 are pivotably skewable and tiltable about correspondingly similar axes for the same reasons as are edge rollers 35 and 36. The rollers 43 and 44 serve to bend the previously unadhered portions of the polymeric film closer to the undersurface of the substrate to which they are next to be adhered. (Station 5 of FIGURE 6.) Rollers 41 and 42 under which the film-clad substrate passes are substantially force balancing rollers for rollers 43 and 44.

The still advancing film-clad substrate next passes under cylindrical rollers 45 and 46 and over cylindrical rollers 47 and 48. The action of rollers 47 and 48 brings the last remaining unadhered portions of the polymeric film into adhesive contact with at least a portion of the undersurface of the advancing substrate. (Station 6 of FIGURE 6.)

The film-wrapped substrate continues to advance out of the wrapping apparatus by the combined driving action of rollers 33 and 34 and rollers 45 and 46 which are driven by a motor through the same variable speed drive. Successive lengths of substrate exit the wrapping apparatus and pass onto a simple belt or roller-type conveyer. At the exit end of the wrapping apparatus, and end-sensing and cut-off apparatus detects the gap between successive lengths of substrate by feeling the undersurface thereof and activating a cut-off mechanism 111 to sever the polymeric film in the gap or alternatively, the film can be cut by hand.

While the apparatus and technology described apply equally to the use of any flexible polymeric film, because of the weatherability required of the laminar constructions which are the obviously preferred products resulting from the practice of this invention, preferred flexible polymeric films include, among others, those of polyvinyl fluoride, polyvinylidene fluoride, polyacrylonitrile, polytetrafluoroethylene and copolymers of tetrafluoroethylene with hexafluoropropylene and also polyvinyl chloride, linear polyesters and linear polyolefins, the latter polymer types particularly when pigmented or when containing or coated with an ultraviolet light absorbing compound.

So that the full utility of the combinations of substrate/ adhesive/film can be realized, it is important that the substrates by adequately cleaned and primed or otherwise treated (e.g., if necessary to minimize adhesive penetration) before combining film and substrate just as would customarily be done prior to painting or applying any other typical protective coating.

Among the natural woods that can be employed as such or in plywood constructions may be mentioned redwood, birch, western hemlock, western red cedar, fir and both yellow and white pine. For best results, the surfaces of these woods should be primed by vacuum brushed free of dust and dirt, primed or sealed by application of a thin coating of the laminating adhesive itself or of a suitable commercial sealer, the coating allowed sufficient time to dry completely, then lightly sanded, if necessary, not only to level out any wood fibers raised by swelling on application of the priming or sealing material but also to remove any dried primer or sealer "skin" which may have formed, and finally vacuum brushed free of sanding dust. The priming step can be omitted provided an extra heavy application of adhesive is used at the time the lamination is made.

A particularly important class of substrates to which polyvinyl fluoride films can be successively laminated by the practice of the present invention are those broadly classified as grainless, ligneous hardboards. In general, these include panelboards made chiefly of highly comminuted cellulosic materials which have been compressed under relatively high pressures at elevated temperatures and thereby fused into self-supporting structures through the binding action of resinous materials either naturally occurring in the cellulosics themselves or purposely added thereto before heating and compression. Cellulosic materials commonly employed in the manufacture of these grainless hardboards include, among others, wood fibers, small chips, sawdust and bark; bagasse, jute and hemp, to name a few. The density and porosity of such hardboards can vary widely depending upon the combined effects of the nature of the cellulosics themselves and their state of comminution, the nature and quantity of any additionally added resinous binding materials as well as the particular conditions of heating and compression employed.

Building siding that has been prepared according to techniques termed textured constitute an appreciable portion of the market area. Because these materials and many cellulosic substrates, particularly natural woods, have a tendency to swell irregularly on exposure to ambient humidity, the expression "substantially planar surface" has been adopted.

While any flexible polymeric film which can be suitable to the end use contemplated can be used, it should be pointed out that many of the above polymeric films require some pretreatment to render their surfaces receptive to adhesives employed in making these laminations.

Polyvinyl fluoride films employed can be manufactured by a variety of methods. A particularly useful method for making polyvinyl fluoride films consists of the steps of feeding a latent solvent/particulate polyvinyl fluoride mixture to a heated extruder which is connected to a slotted casting hopper, from whence a tough, coalesced solvent-containing polyvinyl fluoride film is continuously extruded. This latent solvent-containing film is then stretched longitudinally over heated rolls and then transversely in a tenter frame, in which it is held in restraint while the remaining latent solvent is volatilized. This extrusion and stretching procedure is described in detail in U.S. Patent No. 2,953,818. If desired, various color and/or opacity effects can be achieved by incorporating suitable pigments in the polyvinyl fluoride/latent solvent mixtures being fed to the extruder. Polyvinyl fluoride films containing ultraviolet light screening agents such as polymeric orthohydroxybenzophenones have been found particularly useful where the decorative effect of a clear film over a substrate is desired.

Polyvinyl fluoride film can also be prepared by casting onto suitably smooth surfaces any of the more fluid latent solvent/particulate polyvinyl fluoride compositions described in U.S. Patents 3,000,843 and 3,000,844, followed by heating to coalesce the polymer particles into a unitary film and subsequently heating to volatilize the remaining latent solvent.

The surfaces of polyvinyl fluoride sheets and films can be activated to render them receptive to a variety of adhesives by a number of methods, many of which are suitable for the activation of the surfaces of sheets and films of a wide variety of additional polymers. Among methods which can be successfully employed can be mentioned contacting the surface with gaseous boron trifluoride, aluminum trifluoride dissolved in a suitable organic solvent such as nitrobenzene, or titanium tetrachloride or a solution thereof in a suitable organic solvent; liquid compositions comprising either hydrates or organic coordination complexes of boron trifluoride; concentrated or fuming sulphuric acids, sulfur trioxide, hot aqueous sodium hydroxide; contacting a surface with an open flame while cooling the opposite surface or subjecting the film to a high frequency electrical discharge in a variety of atmospheres.

What is claimed is:

1. A process for applying continuous lengths of polymeric film to the sides of a rigid substrate comprising: continuously advancing successive lengths of a rigid substrate having a polylateral cross-section bounded by at least four substantially planar surfaces; adhesively applying a portion of the width of a continuous length of flexible polymeric film to a first substantially planar surface of each successive length of substrate; adhesively applying the remaining unadhered portion of the width of said film into contact with at least two additional serially contiguous substantially planar surfaces of each successive length of substrate to substantially wrap said substrate with said film and severing said film intermediate said successive lengths of film wrapped substrate.

2. A process for applying continuous lengths of polymeric film to the sides of a rigid substrate comprising: continuously advancing successive lengths of a rigid cellulosic substrate having a polylateral cross-section bounded by at least four substantially planar surfaces; adhesively applying a continuous length of flexible polymeric film to a first substantially planar surface of each successive length of substrate; continuously advancing said substrate with said film applied on said first surface while applying the unadhered portions of the width of said film into adhesive contact with successive adjacent substantially planar surfaces of said substrate until all of the width of said film is adhered to said surfaces to substantially wrap said substrate with said film and severing said film intermediate said successive lengths of film wrapped substrate.

3. The process of claim 2 wherein the polymeric film is polyvinyl fluoride film.

4. A process for applying continuous lengths of polymeric film to the sides of a rigid substrate comprising: continuously advancing successive lengths of a rigid, elongated cellulosic substrate having a quadrilateral cross-section bounded by substantially planar surfaces; adhesively applying a predetermined portion of the width of a continuous length of flexible polyvinyl fluoride film to a first substantially planar surface of each successive length of substrate; continuously advancing said substrate with said film applied on said first surface while rolling the unadhered portions of the width of said film into adhesive contact with the successive adjacent substantially planar surfaces of said substrate until all of the width of said film is adhered to said surfaces to substantially wrap said substrate with said film and severing said film intermediate said successive lengths of film wrapped substrate.

5. An apparatus for applying continuous lengths of polymeric film to the sides of a rigid substrate comprising, in combination: means for continuously advancing successive lengths of a rigid substrate having a polylateral cross-section bounded by at least four substantially planar surfaces; means for adhesively applying a portion of the width of a continuous length of flexible polymeric film to a first substantially planar surface of each successive length of substrate; means for sequentially applying the remaining unadhered portion of the width of said film into adhesive contact with other substantially planar surfaces of said advancing substrate serially contiguous to said first substantially planar surface to substantially wrap said substrate with said film and means for severing said film intermediate said successive lengths of film wrapped substrate.

6. The apparatus of claim 5 wherein the means for applying the film to the substrate are rollers.

7. An apparatus for applying continuous lengths of polymeric film to the sides of a rigid substrate comprising, in combination: means for continuously advancing successive lengths of a rigid, elongated cellulosic substrate having a polylateral cross-section bounded by at least four substantially planar surfaces; nip rollers for applying a predetermined portion of the width of a continuous length of flexible polymeric film having an adhesive coated on one surface into adhesive contact with a first substantially planar surface of each successive length of substrate; resilient, compressively loaded rollers for sequentially applying the remaining unadhered portion of the width of said film into adhesive contact with other substantially planar surfaces of said advancing substrate serially contiguous to said first surface to substantially wrap said substrate with said film, said rollers comprising alternating pairs of rollers in rolling contact with the substantially planar surfaces and pairs of rollers in rolling contact with edges formed between adjacent substantially planar surfaces, each of said rollers of said pairs of rollers disposed in a substantially opposite position on said substrate from its corresponding roller and means for severing said polymeric film intermediate said successive lengths of film wrapped substrate.

8. The apparatus of claim 7 wherein the rollers are rubber-covered cylindrical rollers pivotably supported about an axis perpendicular to the plane generated by its rolling surface and about a separate axis parallel to the direction of travel of said substrate.

9. An apparatus for applying continuous lengths of polymeric film to the sides of a rigid substrate comprising, in combination: roller means for continuously advancing in a longitudinal direction successive lengths of a rigid, elongated cellulosic substrate having a quadrilateral cross-section bounded by substantially planar surfaces; a frame; a transversely movable carriage mounted on said frame; adjustable rubber covered nip rollers positioned at the end of said advancing rollers and attached to said frame, said rollers maintaining continuous rolling contact with the upper and under substantially planar surfaces of each successive length of advancing substrate; a pair of rubber-covered, adjustable, compressively loaded cylindrical edge rollers mounted on said carriage in line with said nip rollers, each of said rollers maintaining continuous rolling contact with the upper edges of the substrate and being pivotably supported about an axis perpendicular to the plane generated by its rolling surface and about a separate axis parallel to the direction of travel of said substrate; rubber-covered, adjustable, compressively loaded rollers mounted on said carriage in line with said nip rollers and said adjustable edge rollers, said rollers maintaining continuous rolling contact with the width of the substantially vertical substantially planar surfaces; two pair of rubber-covered, adjustable, compressively loaded cylindrical rollers mounted on said carriage in line with said previous rollers, each of said rollers of one pair maintaining continuous rolling contact with the lower edges of the substrate and being pivotably supported about an axis perpendicular to the plane generated by its rolling surface and about a separate axis parallel to the direction of travel of said substrate, said second pair of rollers vertically disposed over said first pair of rollers and maintaining continuous rolling contact with said upper substantially planar surface; two pair of rubber-covered, adjustable, compressively loaded cylindrical rollers in a line with said previous rollers, said first pair of rollers mounted on said frame and maintaining continuous rolling contact with said first substantially planar surface, said second pair of rollers mounted on said carriage directly under said first pair of rollers and maintaining continuous rolling contact with the under substantially planar surface.

10. The apparatus of claim 9 wherein the two pair of edge rollers project toward said substrate at angles of 45° to the vertical.

References Cited

UNITED STATES PATENTS

| | | | |
|---|---|---|---|
| 2,251,622 | 8/1941 | Adams | 156—212 X |
| 2,529,859 | 11/1950 | Ambler et al. | 156—522 X |
| 2,991,214 | 7/1961 | Burkholder | 53—28 X |
| 1,465,563 | 8/1923 | Roney | 156—486 X |
| 2,970,634 | 2/1961 | Hantscho | 156—216 X |
| 2,737,764 | 3/1956 | Lewis | 156—582 X |
| 3,133,854 | 5/1964 | Simms | 161—189 |

EARL M. BERGERT, *Primary Examiner.*

PHILIP DIER, *Examiner.*